United States Patent [19]
Tsumura

[11] Patent Number: 5,550,506
[45] Date of Patent: Aug. 27, 1996

[54] DQPSK DEMODULATOR CAPABLE OF IMPROVING A SYMBOL ERROR RATE WITHOUT DECREASING A TRANSMISSION RATE

[75] Inventor: Soichi Tsumura, Tokyo, Japan

[73] Assignee: NEC Corporation, Japan

[21] Appl. No.: 501,478

[22] Filed: Jul. 12, 1995

[30] Foreign Application Priority Data

Jul. 13, 1994 [JP] Japan ................................. 6-161572

[51] Int. Cl.[6] .............................. H03D 3/00; H04L 27/22
[52] U.S. Cl. ........................... 329/304; 375/324; 375/330
[58] Field of Search ........................................ 329/304, 305, 329/310; 375/324, 329–333

[56] References Cited

U.S. PATENT DOCUMENTS

| | | | |
|---|---|---|---|
| 3,470,478 | 9/1969 | Crafts | 329/310 X |
| 4,416,016 | 11/1983 | Iapicco | 329/310 X |
| 4,547,737 | 10/1985 | Gibson | 375/324 X |
| 4,965,810 | 10/1990 | Peischl et al. | 375/330 X |
| 5,017,883 | 5/1991 | Divsalar et al. | 329/304 |

*Primary Examiner*—David Mis
*Attorney, Agent, or Firm*—Ostrolenk, Faber, Gerb & Soffen, LLP

[57] ABSTRACT

A demodulator (20) demodulates a received signal having phase information into a demodulated signal by differential detection. The demodulator comprises a delay section (22-1 to 22-3) which is supplied with an input signal based on a received signal. The delay section delays the input signal to produce first through third delayed signals which have first through third delayed times different from one another. A differential detecting section (23-1, 23-2) carries out differential detection in accordance with the input signal and the first through the third delayed signals to produce first and second output signals. A first correcting section (24) corrects the first delayed signal on the basis of the first output signal to produce a first corrected signal. A second correcting section (25) corrects the second delayed signal on the basis of the second output signal to produce a second corrected signal. A producing section produces the demodulated signal in accordance with the first and the second corrected signals.

16 Claims, 3 Drawing Sheets

DQPSK DEMODULATOR CAPABLE OF IMPROVING A SYMBOL ERROR RATE WITHOUT DECREASING A TRANSMISSION RATE

BACKGROUND OF THE INVENTION

This invention relates to a demodulator for demodulating a received signal into a demodulated signal by differential detection.

It is known in the art that a demodulator demodulates a received signal into a demodulated signal by differential detection. Such a demodulator may be used in a mobile communication system. The received signal is transmitted as a transmission signal from a transmitter. For example, the transmission signal is produced by differential phase shift keying in the transmitter. In this case, the transmission signal has phase information.

A conventional demodulator comprises a phase variation producing section and a demodulator section. The phase variation producing section is supplied with the received signal and produces a phase variation signal representative of a phase variation between an instantaneous phase based on the phase information and a phase offset determined by the demodulator. The phase variation signal is supplied to the demodulator section.

The demodulator section gives a predetermined delay time to the phase variation signal to produce a delayed phase variation signal. Furthermore, the demodulator section carries out differential detection in accordance with the phase variation signal and the delayed phase variation signal to produce the demodulated signal.

Inasmuch as differential detection is carried out in accordance with the phase variation signal and the delayed phase variation signal in the conventional demodulator, a symbol error rate increases in comparison with coherent detection. In order to improve the symbol error rate in the conventional demodulator, it is necessary to produce the transmission signal in using an error-correcting code.

However, transmission rate is decreased on using the error-correcting code as known in the art. Furthermore, it is necessary for the transmitter to have a coding circuit for carrying out error correction coding algorithm. In addition, it is necessary for the conventional demodulator to have a decoding circuit for carrying out decoding. Namely, not only the transmission rate decreases but also demodulator must have a complex structure on using the error-correcting code.

SUMMARY OF THE INVENTION

It is therefore an object of this invention to provide a demodulator capable of improving a symbol error rate without reducing a transmission rate.

It is another object of this invention to provide a demodulator having a simple structure.

Other objects of this invention will become clear as the description proceeds.

On describing the gist of this invention, it is possible to understand that a demodulator is supplied with a modulated signal having phase information as a received signal for demodulating the received signal into a demodulated signal by differential detection.

According to a first aspect of this invention, the demodulator comprises delay means supplied with an input signal based on the received signal for delaying the input signal to produce first through N-th delayed signals which have first through N-th delayed times different from one another, where N represents an odd number which is not less than three, first producing means for carrying out the differential detection in accordance with the input signal and the first through the N-th delayed signals to produce first through K-th output signals, where K represents a positive integer equal to (N+1)/2, the first producing means recursively repeating the differential detection until the positive integer K is equal to two and producing first and second output result signals, and second producing means for producing the demodulated signal in accordance with the first and the second output result signals.

According to a second aspect of this invention, the demodulator comprises delay means supplied with an input signal based on the received signal for delaying the input signal to produce first through third delayed signals which have first through third delayed times different from one another, differential detecting means for carrying out differential detection in accordance with the input signal and the first through the third delayed signals to produce first and second output signals, first correcting means for correcting the first delayed signal in accordance with the first output signal to produce a first corrected signal, second correcting means for correcting the second delayed signal in accordance with the second output signal to produce a second corrected signal, and producing means for producing the demodulated signal in accordance with the first and the second corrected signals.

According to a third aspect of this invention, the demodulator comprises delay means supplied with an input signal based on the received signal for delaying the input signal to produce first through fifth delayed signals which have first through fifth delayed times different from one another, first differential detecting means for carrying out differential detection in accordance with the input signal and the first through the fifth delayed signals to produce first through third output signals, first correcting means for correcting the first delayed signal in accordance with the first output signal to produce a first corrected signal, second correcting means for correcting the second and the third delayed signals in accordance with the second output signal to produce second and third corrected signals, third correcting means for correcting the fourth delayed signal in accordance with the third output signal to produce a fourth corrected signal, second differential detecting means for carrying out differential detection in accordance with the first through the fourth corrected signals to produce fourth and fifth output signals, fourth correcting means for correcting the second corrected signal in accordance with the fourth output signal to produce a fifth corrected signal, fifth correcting means for correcting the third corrected signal in accordance with the fifth output signal to produce a sixth corrected signal, and producing means for producing the demodulated signal in accordance with the fifth and the sixth corrected signals.

DESCRIPTION OF THE PREFERRED EMBODIMENTS

Figure 1:
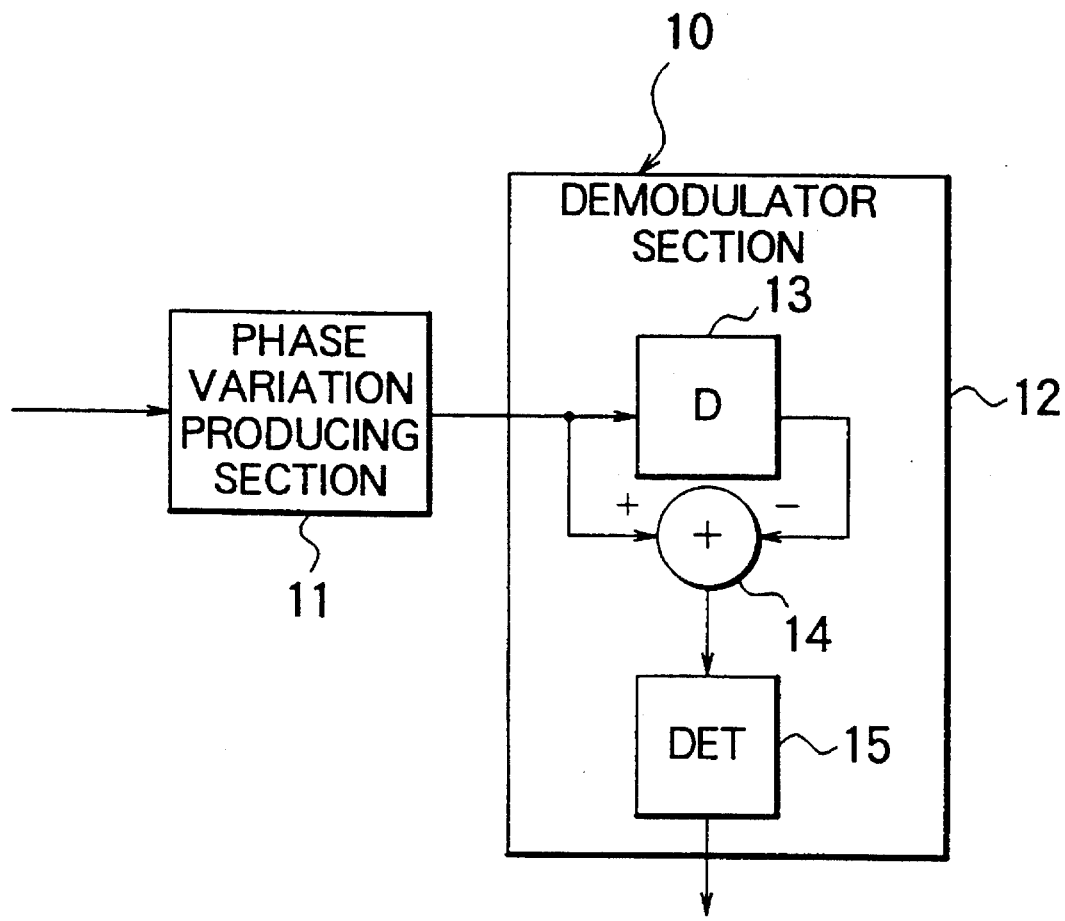
FIG. 1 is a block diagram of a conventional demodulator.

Referring to FIG. 1, description will first be made as regards a conventional demodulator 10 for a better understanding of this invention. The demodulator 10 is supplied with a modulated signal as a received signal which is transmitted from a transmitter (not shown). For example, the modulated signal is produced by differential quadrature phase shift keying (DQPSK) in the transmitter. In this case, the modulated signal has phase information. The demodulator 10 is operable to demodulate the received signal into a demodulated signal by differential detection.

The demodulator 10 comprises a phase variation producing section 11 and a demodulator section 12. Supplied with the received signal, the phase variation producing section 11 produces a phase variation signal representative of a phase variation between an instantaneous phase based on the phase information and a phase offset determined by the demodulator 10.

More particularly, it will be assumed that the phase information represents four phase positions apart from each other by π/4 radians (on I-Q signal space). The phase offset determined by the demodulator 10 may represent a fixed phase position. The phase variation producing section 11 compares each of phase positions with the fixed phase position to produce the phase variation signal.

The phase variation signal is supplied to the demodulator section 12 to be subjected to differential detection. The demodulator section 12 comprises a delay circuit (D) 13, a subtracter circuit 14, and a data judging circuit (DET) 15. The delay circuit 13 gives a predetermined delay time to the phase variation signal to produce a delayed phase variation signal. The predetermined delay time may be equal to a time duration of a symbol.

Supplied with the phase variation signal and the delayed phase variation signal, the subtracter circuit 14 subtracts the delayed phase variation signal from the phase variation signal to produce a phase difference signal having a difference level representative of a phase difference between the phase variation signal and the delayed phase variation signal. Namely, the subtracter circuit 14 carries out differential detection in accordance with the the phase variation signal and the delayed phase variation signal to produce the phase difference signal.

The phase difference signal is supplied from the subtracter circuit 14 to the data judging circuit 15. The judging circuit 15 judges which phase difference level among all of modulated phase difference levels is the most like with the difference level of the phase difference signal to produce the demodulated signal as known in the art.

By the way, a symbol error rate increases in comparison with coherent detection inasmuch as differential detection is carried out in accordance with the phase variation signal and the delayed phase variation signal in the demodulator 10. In order to improve the symbol error rate in the demodulator 10, it is necessary to produce the transmission signal in using an error-correcting code.

However, transmission rate is decreased on using the error-correcting code as known in the art. Furthermore, it is necessary for the demodulator 10 to have a decoding circuit for carrying out decoding. Namely, not only the transmission rate is decreased but also demodulator 10 must have a complex structure on using the error-correcting code.

Figure 2:
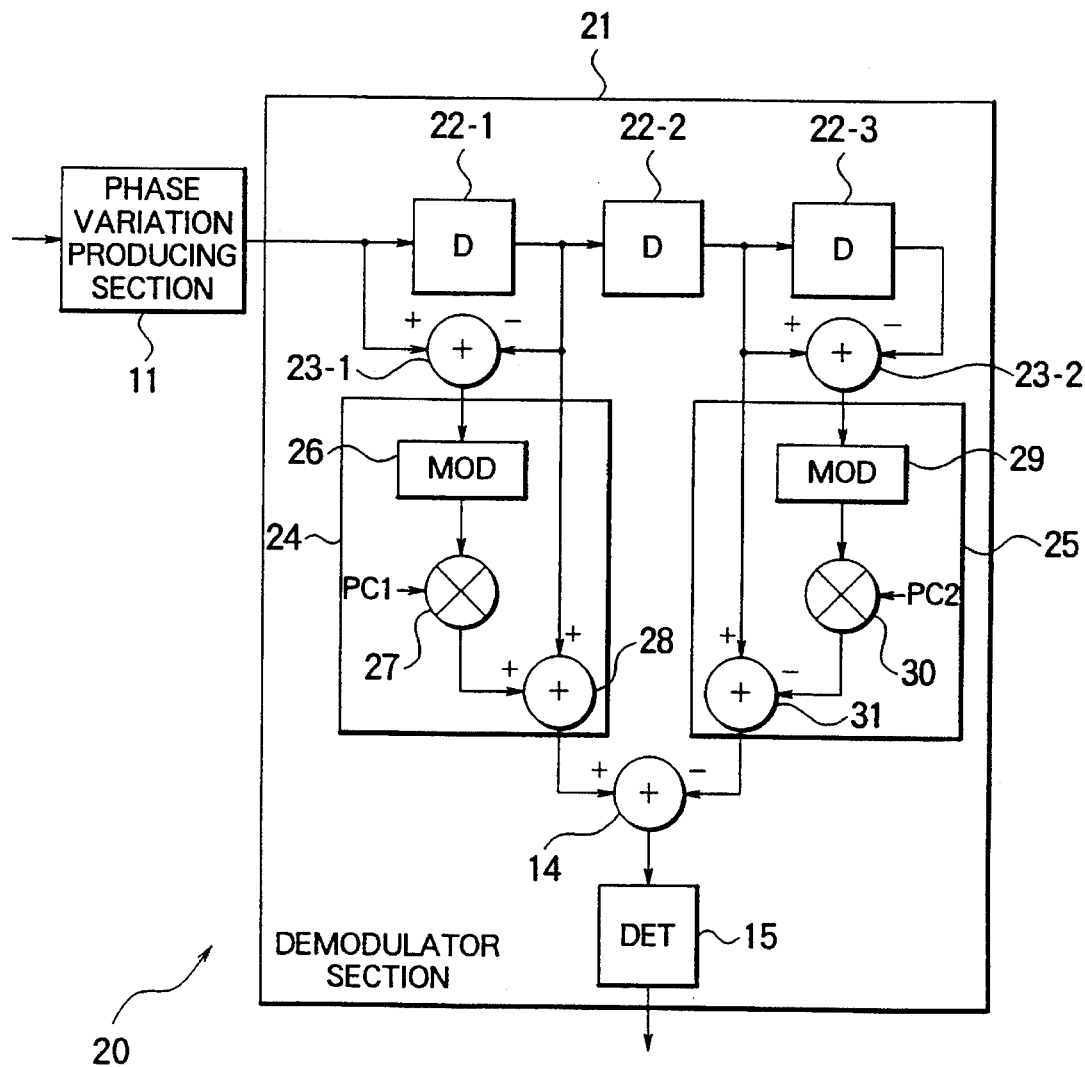
FIG. 2 is a block diagram of a demodulator according to a first embodiment of this invention.

Referring to FIG. 2, description will proceed to a demodulator according to a first embodiment of this invention. The illustrated demodulator is different in structure from the demodulator 10 described in conjunction with FIG. 1 and is therefore designated afresh by a reference numeral 20. The demodulator 20 comprises the phase variation producing section 11 described in conjunction with FIG. 1 and a demodulator section 21 different in structure from the demodulator section 12 illustrated in FIG. 1. The demodulator section 21 comprises similar parts which are designated by like reference numerals and are operable with likewise named signals.

The demodulator section 21 comprises first through N-th delay circuits 22-1 to 22-N, where N represents an odd number which is not less than three. In the example being illustrated, the odd number N is equal to three. Each of the first through the third delay circuits 22-1 to 22-3 gives a delay of a predetermined time to a signal supplied thereto. The first through the third delay circuits 22-1 to 22-3 produce first through third delayed signals, respectively. More particularly, the first through the third delay circuits 22-1 to 22-3 produce first through third delayed phase variation signals, respectively.

The demodulator section 21 further comprises first through K-th primary subtracter circuits 23-1 to 23-K, where K represents a positive integer equal to (N+1)/2. When the odd number N is equal to three, the positive integer K is equal to two. Supplied with the phase variation signal and the first delayed phase variation signal, the first primary subtracter circuit 23-1 subtracts the first delayed phase variation signal from the phase variation signal. More particularly, the first primary subtracter circuit 23-1 calculates a first phase difference between the first delayed phase variation signal and the phase variation signal to produce a first phase difference signal representative of the first phase difference. Similarly, the second primary subtracter circuit 23-2 calculates a second phase difference between the second delayed phase variation signal and the third delayed phase variation signal to produce a second phase difference signal representative of the second phase difference. The first and the second phase difference signals may be called first and second output signals, respectively.

The first and the second phase difference signals are supplied to first and second correcting circuits 24 and 25. The first correcting circuit 24 corrects the first delayed phase variation signal in accordance with the first phase difference signal to produce a first corrected phase signal which may be called a first output result signal. Similarly, the second correcting circuit 25 corrects the second delayed phase variation signal in accordance with the second phase difference signal to produce a second corrected phase signal which may be called a second output result signal.

More specifically, the first correcting circuit 24 comprises a first error detecting circuit (MOD) 26, a first multiplier circuit 27, and an adder circuit 28. The first error detecting circuit 26 is supplied with the first phase difference signal and detects a first phase error between the first phase difference and an ideal phase difference based on a tentative demodulated signal to produce a first phase error signal representative of the first phase error. The ideal phase difference based on the tentative demodulated signal may be referred to as a first ideal phase difference in the first correcting circuit 24, and this first ideal phase difference may be determined in accordance with the tentative demodulated signal. The tentative demodulated signal may be equivalent to an output signal outputted from the data judging circuit 15 when the first phase signal is supplied to the data judging circuit 15. The first ideal phase difference is representative of a phase difference of the tentative demodulated signal that is nearest to the first phase difference as represented on an I-Q coordinate. The tentative demodulated signal may be preliminarily set as a first phase information in the first error detecting circuit.

Supplied with the first phase error signal, the first multiplier circuit 27 multiplies the first phase error signal by a predetermined coefficient PC to produce a first multiplied signal. The predetermined coefficient PC may represent a value between zero and one (both exclusive). The adder circuit 28 calculates a sum of the first multiplied signal and the first delayed phase variation signal to produce the first corrected phase signal.

The second correcting circuit 25 comprises a second error detecting circuit (MOD) 29, a second multiplier circuit 30, and a subtracter circuit 31. The second error detecting circuit 29 is supplied with the second phase difference signal and detects a second phase error between the second phase difference and an ideal phase difference based on a tentative demodulated signal to produce a second phase error signal representative of the second phase error. The ideal phase difference based on the tentative demodulated signal may be referred to as a second ideal phase difference in the second correcting circuit 24, an this second ideal phase difference may be determined in accordance with the tentative demodulated signal. The tentative demodulated signal may be equivalent to an output signal outputted from the data judging circuit 15 when the second phase signal is supplied to the data judging circuit 15. The second ideal phase difference is representative of a phase difference of the tentative demodulated signal that is nearest to the second phase difference as represented on an I-Q coordinate. The tentative demodulated signal is preliminarily set as a second phase information in the second error detecting circuit 26.

Supplied with the second phase error signal, the second multiplier circuit 30 multiplies the second phase error signal by a predetermined coefficient PC2 ($0<PC2<1$) to produce a second multiplied signal. The subtracter circuit 31 subtracts the second multiplied signal from the second delayed phase variation signal to produce the second corrected phase signal.

The first and the second corrected phase signals are supplied to the main subtracter circuit 14. The main subtracter circuit 14 subtracts the second corrected phase signal from the first corrected phase signal to produce the phase difference signal having the phase difference level. The phase difference signal is delivered to the data judging circuit 15. The data judging circuit 15 judges which phase difference level among all of modulated phase difference levels is the most like with the phase difference level of the phase difference signal to produce the demodulated signal.

As readily understood from the above description, the first and the second primary subtracter circuits 23-1 and 23-2 and the first and the second correcting circuits 24 and 25 are collectively operable as a first producing section for carrying out the differential detection in accordance with the phase variation signal and the first through the third delayed phase variation signals to produce first and second output result signals. When the demodulator section 21 comprises the first through the N-th delay circuits 22-1 to 22-N, the first producing section carries out the differential detection in accordance with the phase variation signal and the first through the N-th delayed phase variation signals until the positive integer K is equal to two.

Figure 3:
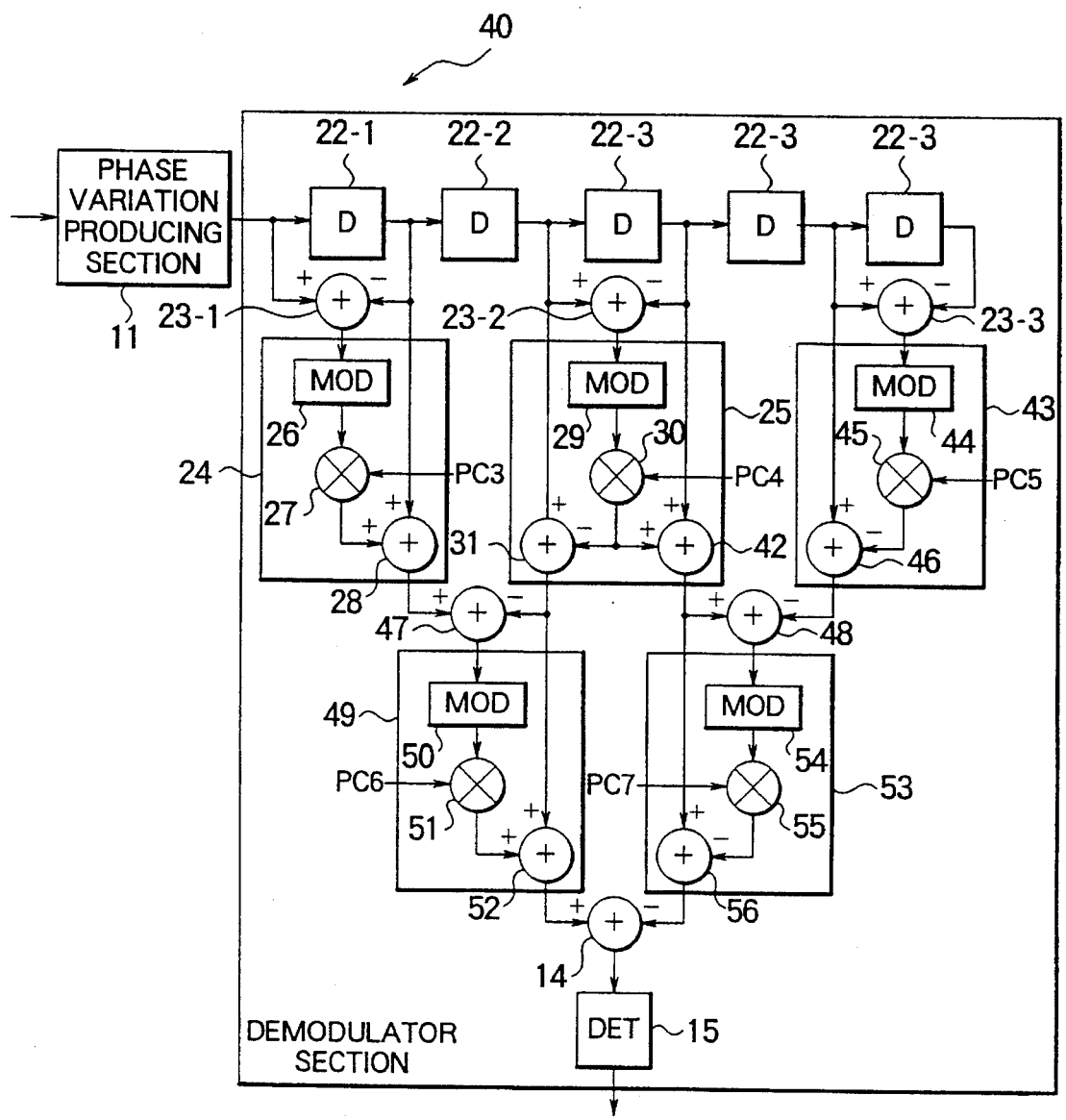
FIG. 3 is a block diagram of a demodulator according to a second embodiment of this invention.

Referring to FIG. 3, description will proceed to a demodulator according to a second embodiment of this invention. In the illustrated example, the odd number N is equal to five and the positive integer K is equal to three. The illustrated demodulator is different in structure from the demodulator 20 described in conjunction with FIG. 2 and is therefore designated afresh by a reference numeral 40. The demodulator 40 comprises the phase variation producing section 11 described in conjunction with FIG. 1 and a demodulator section 41 different in structure from the demodulator section 21 illustrated in FIG. 2. The demodulator section 41 comprises similar parts which are designated by like reference numerals.

The demodulator section 41 comprises the first through the fifth delay circuits 22-1 to 22-5. The first through the fifth delay circuits 22-1 to 22-5 produce the first through the fifth delayed phase variation signals, respectively.

The demodulator section 41 comprises the first through the third primary subtracter circuits 23-1 to 23-3. The first through the third primary subtracter circuits 23-1 to 23-3 produce the first through the third phase difference signals, respectively.

As described in conjunction with FIG. 2, the first correcting circuit 24 produces the first corrected phase signal in accordance with the first phase difference signal and the first delayed phase variation signal.

The second correcting circuit 25 illustrated in FIG. 3 is different in structure from the second correcting circuit 25 illustrated in FIG. 2. In FIG. 3, the second correcting circuit 25 further comprises an adder circuit 42. The adder circuit 42 calculates a sum of the second multiplied signal and the third delayed phase variation signal to produce a sum signal as a third corrected phase signal.

The third phase difference signal is supplied to a third correcting circuit 43 which is similar in structure to the second correcting circuit 25 illustrated in FIG. 2. The third correcting circuit 43 comprises a third error detecting circuit 44, a third multiplier circuit 45, and a subtracter circuit 46. The third correcting circuit 43 produces a fourth corrected phase signal in accordance with the third phase difference signal and the fourth delayed phase variation signal.

The demodulator section 41 further comprises first and second subsidiary subtracter circuits 47 and 48. Supplied with the first and the second corrected phase signals, the first subsidiary subtracter circuit 47 subtracts the second corrected phase signal from the first corrected phase signal to produce a fourth phase difference signal. More particularly, the first subsidiary subtracter circuit 47 calculates a fourth phase difference between the first and the second corrected phase signals to produce the fourth phase difference signal representative of the fourth phase difference.

Similarly, the second subsidiary subtracter circuit 48 subtracts the fourth corrected phase signal from the third corrected phase signal to produce a fifth phase difference signal representative of a fifth phase difference.

The fourth phase difference signal is supplied with a fourth correcting circuit 49. Furthermore, the second corrected phase signal is supplied with the fourth correcting circuit 49. The fourth correcting circuit 49 is similar in structure to the first correcting circuit 24. The fourth correcting circuit 49 comprises a fourth phase error detecting circuit 50, a fourth multiplier circuit 51, and an adder circuit 52 and produces a fifth corrected phase signal in accordance with the fourth phase difference signal and the second corrected phase signal.

The fifth phase difference signal is supplied with a fifth correcting circuit 53. Furthermore, the third corrected phase signal is supplied with the fifth correcting circuit 53. The fifth correcting circuit 53 is similar in structure to the third correcting circuit 43. The fifth correcting circuit 53 comprises a fifth phase error detecting circuit 54, a fifth multiplier circuit 55, and a subtracter circuit 56 and produces a sixth corrected phase signal in accordance with fifth phase difference signal and the third corrected phase signal.

Supplied with the fifth and the sixth corrected phase signals, the main subtracter circuit 32 calculates the main phase difference between the fifth and the six corrected phase signals to produce the main phase difference signal representative of the main phase difference having the main phase difference level.

As described in conjunction with FIG. 2, the data judging circuit 33 produces the demodulated signal on the basis of the main phase difference signal.

As readily understood from the above description, the first through the third primary subtracter circuits 23-1 to 23-3, the first through the fifth correcting circuits, and the first and the second subsidiary subtracter circuits are collectively operable as the first producing section for carrying out the differential detection in accordance with the phase variation signal and the first through the fifth delayed phase variation signals to produce first through fourth output signals. The first producing section recursively repeats the differential detection until positive integer K is equal to two.

What is claimed is:

1. A demodulator supplied with a modulated signal having phase information as a received signal for demodulating said received signal into a demodulated signal by differential detection, comprising:

delay means supplied with an input signal based on said received signal for delaying said input signal to produce first through N-th delayed signals which have first through N-th delayed times different from one another, where N represents an odd number which is not less than three;

first producing means for carrying out said differential detection in accordance with said input signal and said first through said N-th delayed signals to produce first through K-th output signals, where K represents a positive integer equal to (N+1)/2, said first producing means recursively repeating said differential detection until said positive integer K is equal to two and producing first and second output result signals; and second producing means for producing said demodulated signal in accordance with said first and said second output result signals.

2. A demodulator as claimed in claim 1, further comprising:

third producing means supplied with said received signal for producing a phase variation signal representative of an instantaneous phase based on a phase offset determined by said demodulator to supply said phase variation signal as said input signal to said delay means and said first producing means.

3. A demodulator as claimed in claim 1, wherein said second producing means comprises:

subtracter means for subtracting said second output result signal from said first output result signal to produce a phase difference signal having a phase difference level; and judging means for judging which phase difference level among all of modulated phase difference levels is the most like with the phase difference level of said phase difference signal to produce said demodulated signal.

4. A demodulator as claimed in claim 1, wherein said modulated signal is produced by differential quadrature phase shift keying or differential π/4 shifted quadrature phase shift keying.

5. A demodulator supplied with a modulated signal having phase information as a received signal for demodulating said received signal into a demodulated signal by differential detection, comprising:

delay means supplied with an input signal based on said received signal for delaying said input signal to produce first through third delayed signals which have first through third delayed times different from one another;

differential detecting means for carrying out said differential detection in accordance with said input signal and said first through said third delayed signals to produce first and second output signals;

first correcting means for correcting said first delayed signal in accordance with said first output signal to produce a first corrected signal;

second correcting means for correcting said second delayed signal in accordance with said second output signal to produce a second corrected signal; and producing means for producing said demodulated signal in accordance with said first and said second corrected signals.

6. A demodulator as claimed in claim 5, further comprising:

additional producing means supplied with said received signal for producing a phase variation signal representative of a phase variation between an instantaneous phase based on said phase information and a phase offset determined by said demodulator to supply said phase variation signal as said input signal to said delay means and said differential detecting means.

7. A demodulator as claimed in claim 5, wherein said differential detecting means comprises:

first subtracter means supplied with said input signal and first delayed signal for subtracting said first delayed signal from said input signal to produce a first phase difference signal as said first output signal, said first phase difference signal being representative of a first phase difference; and second subtracter means supplied with said second and said third delayed signals for subtracting said third delayed signal from said second delayed signal to produce a second phase difference signal as said second output signal, said second phase difference signal being representative of a second phase difference.

8. A demodulator as claimed in claim 5, wherein said first correcting means comprises:

first error detecting means supplied with said first output signal for detecting a first phase error between said first output signal and an ideal phase difference based on a tentative demodulated signal to produce a first phase error signal representative of said first phase error;

first multiplier means for multiplying said first phase error signal by a predetermined coefficient to produce a first multiplied signal; and adder means for calculating a sum of said first multiplied signal and said first delayed signal to produce a sum signal as said first corrected signal;

said second correcting means comprises:

second error detecting means supplied with said second output signal for detecting a second phase error between said second output signal and an ideal phase difference based on a tentative demodulated signal to produce a second phase error signal representative of said second phase error;

second multiplier means for multiplying said second phase error signal by the predetermined coefficient to produce a second multiplied signal; and third subtracter means for subtracting said second multiplied signal from said second delayed signal to produce a third phase difference signal as said second corrected signal.

9. A demodulator as claimed in claim 5, wherein said producing means comprises:

main subtracter means for subtracting said second corrected signal from said first corrected signal to produce a fourth phase difference signal having a phase difference level; and judging means for judging which phase difference level among all of modulated phase difference levels is the most like with the phase difference level of said fourth phase difference signal to produce said demodulated signal.

10. A demodulator as claimed in claim 5, wherein said modulated signal is produced by differential N level phase shift keying.

11. A demodulator supplied with a modulated signal having phase information as a received signal for demodulating said received signal into a demodulated signal by differential detection, comprising:

delay means supplied with an input signal based on said received signal for delaying said input signal to produce first through fifth delayed signals which have first through fifth delayed times different from one another;

first differential detecting means for carrying out said differential detection in accordance with said input signal and said first through said fifth delayed signals to produce first through third output signals;

first correcting means for correcting said first delayed signal in accordance with said first output signal to produce a first corrected signal;

second correcting means for correcting said second and said third delayed signals in accordance with said second output signal to produce second and third corrected signals;

third correcting means for correcting said fourth delayed signal in accordance with said third output signal to produce a fourth corrected signal;

second differential detecting means for carrying out said differential detection in accordance with said first through said fourth corrected signals to produce fourth and fifth output signals;

fourth correcting means for correcting said second corrected signal in accordance with said fourth output signal to produce a fifth corrected signal;

fifth correcting means for correcting said third corrected signal in accordance with said fifth output signal to produce a sixth corrected signal; and producing means for producing said demodulated signal in accordance with said fifth and said sixth corrected signals.

12. A demodulator as claimed in claim 11, further comprising:

additional producing means supplied with said received signal for producing a phase variation signal representative of an instantaneous phase based on said phase information and a phase offset determined by said demodulator to supply said phase variation signal as said input signal to said delay means and said first differential detecting means.

13. A demodulator as claimed in claim 11, wherein said first differential detecting means comprises:

first primary subtracter means supplied with said input signal and first delayed signal for subtracting said first delayed signal from said input signal to produce a first phase difference signal as said first output signal, said first phase difference signal being representative of a first phase difference;

second primary subtracter means supplied with said second and said third delayed signals for subtracting said third delayed signal from said second delayed signal to produce a second phase difference signal as said second output signal, said second phase difference signal being representative of a second phase difference; and third primary subtracter means supplied with said fourth and said fifth delayed signals for subtracting said fifth delayed signal from said fourth delayed signal to produce a third phase difference signal as said third output signal, said third phase difference signal being representative of a third phase difference.

14. A demodulator as claimed in claim 11, wherein:

said first correcting means comprises:

first error detecting means supplied with said first output signal for detecting a first phase error between said first output signal and an ideal phase difference based on a tentative demodulated signal to produce a first phase error signal representative of said first phase error;

first multiplier means for multiplying said first phase error signal by a predetermined coefficient to produce a first multiplied signal; and first adder means for calculating a sum of said first multiplied signal and said first delayed signal to produce a sum signal as said first corrected signal;

said second correcting means comprising:

second error detecting means supplied with said second output signal for detecting a second phase error between said second output signal and an ideal phase difference based on a tentative demodulated signal to produce a second phase error signal representative of said second phase error;

second multiplier means for multiplying said second phase error signal by said predetermined coefficient to produce a second multiplied signal;

first subsidiary subtracter means supplied with said second delayed signal and said second multiplied signal for subtracting said second multiplied signal from said second delayed signal to produce said second corrected signal; and second adder means for calculating a sum of said second multiplied signal and said third delayed signal to produce a sum signal as said third corrected signal;

said third correcting means comprising:

third error detecting means supplied with said third output signal for detecting a third phase error between said third output signal and an ideal phase difference based on a tentative demodulated signal to produce a third phase error signal representative of said third phase error;

third multiplier means for multiplying said third phase error signal by said predetermined coefficient to produce a third multiplied signal; and second subsidiary subtracter supplied with said third multiplied signal and said fourth delayed signal for subtracting said third multiplied signal from said fourth delayed signal to produce said fourth corrected signal;

said second differential detecting means comprising:

fourth primary subtracter means supplied with said first and said second corrected signals for subtracting said second corrected signal from said first corrected signal to produce a fourth phase difference signal as said fourth output signal, said fourth phase difference signal being representative of a fourth phase difference; and fifth primary subtracter means supplied with said third and said fourth corrected signals for subtracting said fourth corrected signal from said third corrected signal to produce a fifth phase difference signal as said fifth output signal, said fifth phase difference signal being representative of a fifth phase difference;

said fourth correcting means comprising:

fourth error detecting means supplied with said fourth output signal for detecting a fourth phase error between said fourth output signal and an ideal phase difference based on a tentative demodulated signal to produce a fourth phase error signal representative of said fourth phase error;

fourth multiplier means for multiplying said fourth phase error signal by said predetermined coefficient to produce a fourth multiplied signal; and third adder means for calculating a sum of said fourth multiplied signal and said second corrected signal to produce a sum signal as said fifth corrected signal;

said fifth correcting means comprising:

fifth error detecting means supplied with said fifth output signal for detecting a fifth phase error between said fifth output signal and an ideal phase difference based on a tentative demodulated signal to produce a fifth phase error signal representative of said fifth phase error;

fifth multiplier means for multiplying said fifth phase error signal by said predetermined coefficient to produce a fifth multiplied signal; and third subsidiary subtracter means supplied with said fifth multiplied signal and said third corrected signal for subtracting said fifth multiplied signal from said third corrected signal to produce said sixth corrected signal.

15. A demodulator as claimed in claim 11, wherein said producing means comprises:

main subtracter means for subtracting said sixth corrected signal from said fifth corrected signal to produce a sixth phase difference signal having a phase difference level; and judging means for judging which phase difference level among all of modulated phase difference levels is the most like with the phase difference level of said sixth phase difference signal to produce said demodulated signal.

16. A demodulator as claimed in claim 11, wherein said modulated signal is produced by differential N level phase shift keying.

* * * * *